United States Patent
Takahashi (10) Patent No.: US 6,837,570 B2
(45) Date of Patent: Jan. 4, 2005

(54) PRINT DEVICE AND PRINT PROCESSING METHOD

(75) Inventor: Masato Takahashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/182,199

(22) PCT Filed: Nov. 27, 2001

(86) PCT No.: PCT/JP01/10320

§ 371 (c)(1),
(2), (4) Date: Feb. 14, 2003

(87) PCT Pub. No.: WO02/45410

PCT Pub. Date: Jun. 6, 2002

(65) Prior Publication Data

US 2003/0151641 A1 Aug. 14, 2003

(30) Foreign Application Priority Data

Nov. 29, 2000 (JP) ........................................ 2000-362656
Mar. 29, 2001 (JP) ........................................ 2001-169254

(51) Int. Cl.[7] .............................. B41J 2/21; B41J 2/205
(52) U.S. Cl. .......................................... 347/43; 347/15
(58) Field of Search .............................. 347/43, 15, 19; 358/3.01, 3.03, 3.13, 3.23; 382/162

(56) References Cited

FOREIGN PATENT DOCUMENTS

| JP | 62-169 | 1/1987 |
|---|---|---|
| JP | 62-164375 | 7/1987 |
| JP | 5-276368 | 10/1993 |
| JP | 9-9054 | 1/1997 |
| JP | 10-200765 | 7/1998 |
| JP | 10-276341 | 10/1998 |
| JP | 11-164164 | 6/1999 |
| JP | 2000-137472 | 5/2000 |
| JP | 2001-285662 | 10/2001 |

*Primary Examiner*—Thinh Nguyen
(74) *Attorney, Agent, or Firm*—Dickstein Shapiro Morin & Oshinsky LLP (57) ABSTRACT

A printing apparatus of the present invention includes a dither processing unit which converts multi-value data of C (cyan), M (magenta), and Y (yellow) into binary CMY data, and further includes a black generation processing unit which generates a gray plane by a logical product between C, M, and Y of the binary CMY data, and generates K (black) at positions of some of gray pixels of the gray plane according to a probability responsive to a density of the gray pixels in the gray plane while refraining from generating K at positions of remaining gray pixels.

13 Claims, 12 Drawing Sheets

PRINT DEVICE AND PRINT PROCESSING METHOD

FIELD OF THE INVENTION

The present invention generally relates to printer apparatuses, and particularly relates to a color printer apparatus which converts multi-value color data into the binary color data of cyan C, magenta M, and yellow Y, and prints CMYK after generating the binary data of black K.

BACKGROUND OF THE INVENTION

An image processing apparatus that generate color printing data CMYK (K: black) from color data CMY (cyan, magenta, yellow) is disclosed, for example, in Japanese Patent Laid-open Application No. 11-164164. This image processing apparatus detects the density of the black color from the CMY binary color data, and generates image patterns for black generation processing (BG processing) and under-color removal processing (UCR processing) based on the detected density, followed by generating the CMYK color print data based on the generated patterns. Some related technologies are disclosed in Japanese Patent Laid-open Applications No. 5-276368 and No. 10-200765, for example.

A straightforward method of generating K from the CMY binary data would be to calculate K=C&M&Y. In this method, however, K is generated at all pixels where CMY is 1 indicative of a gray color. If all the C, M, Y, and K colors are printed in areas where the density of the gray color is high (i.e., areas where the density of K pixels is high), an excessive amount of toner would end up being applied. There is thus a need to perform the UCR processing to remove CMY in areas where K pixels are generated. If the UCR processing is performed after generating the K pixels, however, all the gray pixels where CMY is 1 are changed to pixels having only the K color. As a result, a reproduced image ends up lacking rich color.

Namely, all the gray pixels are subjected to the BG processing that generates K, and end up lacking rich color because of the UCR processing performed thereon.

SUMMARY OF THE INVENTION

It is a general object of the present invention to substantially obviate one or more of the problems of the related art.

Further, it is another and more specific object of the present invention to reduce the number of pixels at which K is generated at the time of BG processing, and to reduce the number of pixels subjected to the UCR processing at the time of the UCR processing.

In order to achieve the above objects, a printing apparatus according to the present invention includes a dither processing unit which converts multi-value data of C (cyan), M (magenta), and Y (yellow) into binary CMY data, and a black generation processing unit which generates a gray plane by a logical product between C, M, and Y of the binary CMY data, and generates K (black) at positions of some of gray pixels of the gray plane according to a probability responsive to a density of the gray pixels in the gray plane while refraining from generating K at positions of remaining gray pixels.

In the invention described above, straightforward generation such as K=C&M&Y is not practiced when generating K from binary CMY data, and a decision as to whether or not to generate K is made based on the probability responsive to the density of the gray pixels. As a result, the number of pixels at which K is generated is reduced compared with the case where K=C&M&Y is practiced, thereby avoiding the undesirable loss of rich color in the gray-color areas of a printed image.

According to another aspect of the present invention, the probability of the UCR processing being performed is controlled by multiplying the density of gray pixels with a multiplication factor rather than performing the UCR processing on all the K pixels determined by the BG processing. This reduces the number of pixels at which the UCR processing is performed, thereby making it possible to print images with richer color.

According to yet another aspect of the present invention, in the gray plane used for the BG processing and the UCR processing, pixels below a predetermined level are masked so as to prevent K generation at pixels below the predetermined level, thereby generating images of high quality.

DESCRIPTION OF THE PREFERRED EMBODIMENTS

Figure 1:
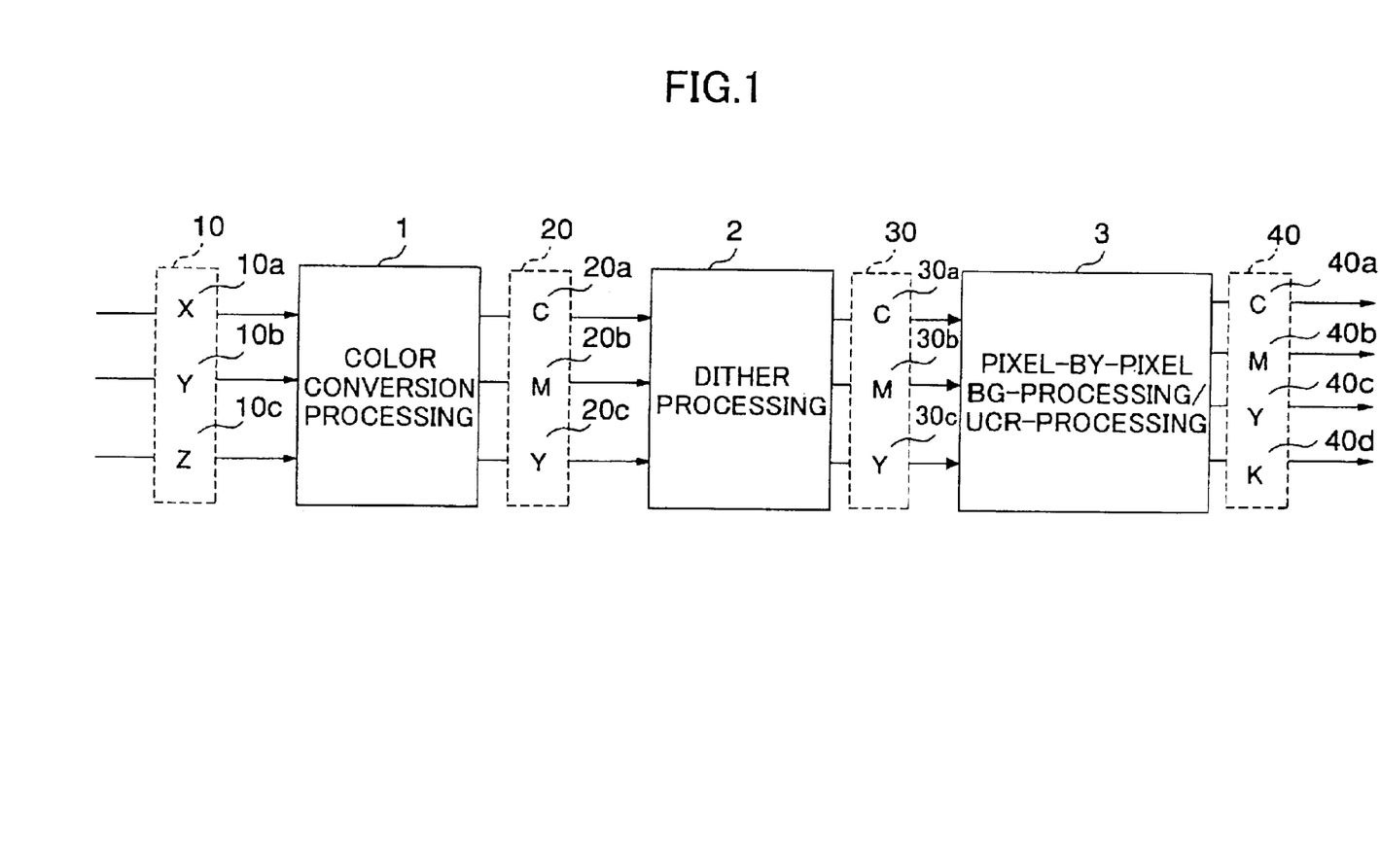
FIG. 1 is a block diagram showing an example of a functional configuration of a color printer apparatus according to the present invention.

FIG. 1 is a block diagram showing an example of a functional configuration of a color printer apparatus according to the present invention. In FIG. 1, the color printer apparatus includes a color conversion processing unit 1, a dither processing unit 2, and a pixel-by-pixel BG-processing/UCR-processing unit 3. Color space data 10 of any kind is comprised of color space data 10a, 10b, and 10c. CMY data 20 obtained through conversion by the color conversion processing unit 1 includes C (cyan) data 20a, M (magenta) data 20b, and Y (yellow) data 20c. CMY data 30 obtained through conversion by the dither processing unit 2 includes C data 30a, M data 30b, and Y data 30c. CMYK plane data 40 obtained through conversion by the pixel-by-pixel BG-processing/UCR-processing unit 3 includes C plane data 40a, M plane data 40b, Y plane data 40c, and K plane data 40d.

Upon receiving the color space data 10 of any kind, the color conversion processing unit 1 converts the color space data 10 into the CMY data 20. The dither processing unit 2 then performs dither processing on each of the converted C data 20a, M data 20b, and Y data 20c, thereby generating the CMY data 30. The pixel-by-pixel BG-processing/UCR-processing unit 3 carries out the BG processing and the UCR processing on the generated CMY data 30 on a pixel-by-pixel basis, thereby converting it into the CMYK plane data 40. The CMYK plane data 40 is transferred to the printer-engine side.

Figure 2:
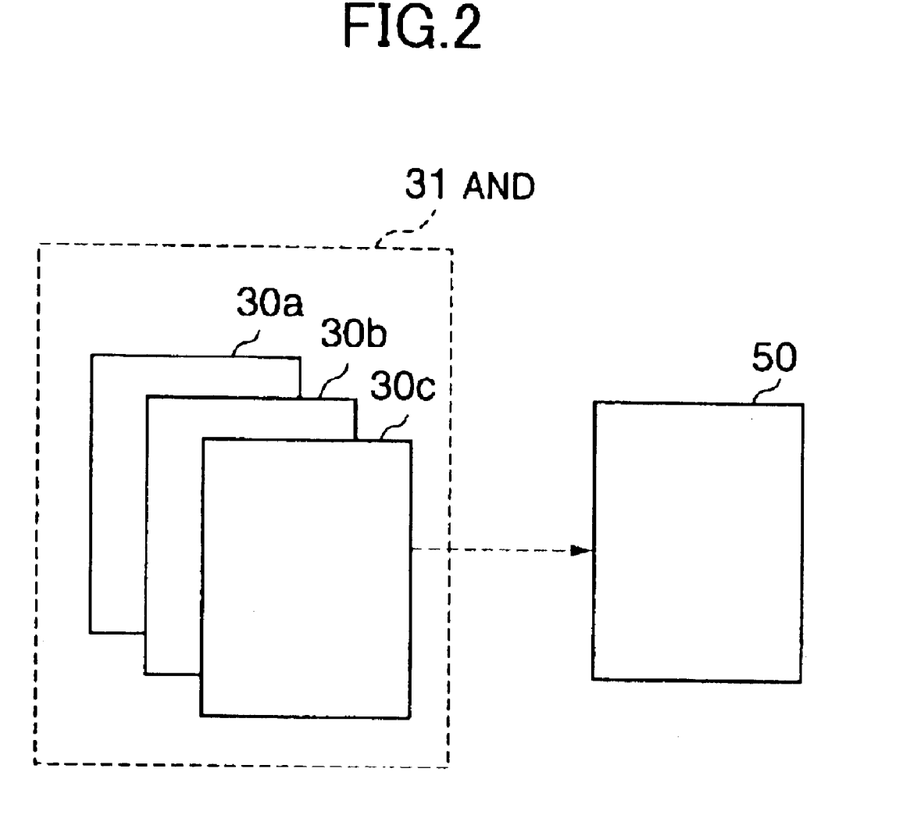
FIG. 2 is a diagram for explaining the generation of gray plane data by a pixel-by-pixel BG-processing/UCR-processing unit.

FIG. 2 is a diagram for explaining the generation of gray plane data by the pixel-by-pixel BG-processing/UCR-processing unit 3. In FIG. 2, gray plane data 50 is generated by performing an AND operation 31 between the C data 30a, the M data 30b, and the Y data 30c.

Figure 3A:
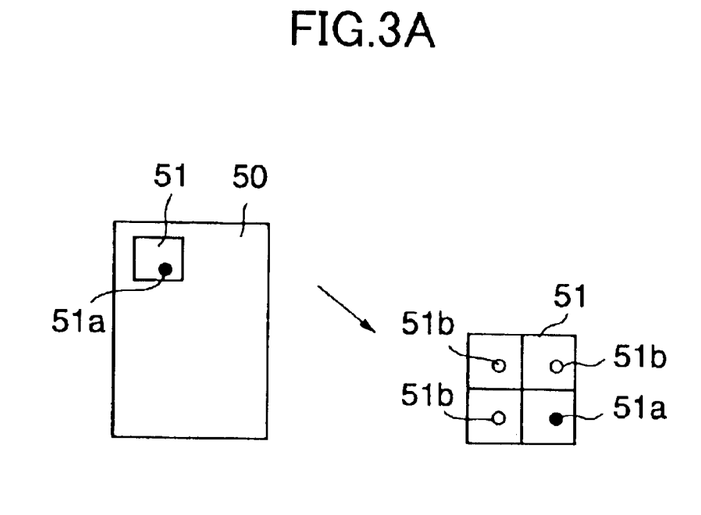
FIGS. 3A and 3B are drawings for explaining the generation of K plane data based on the gray plane data.
Figure 3B:
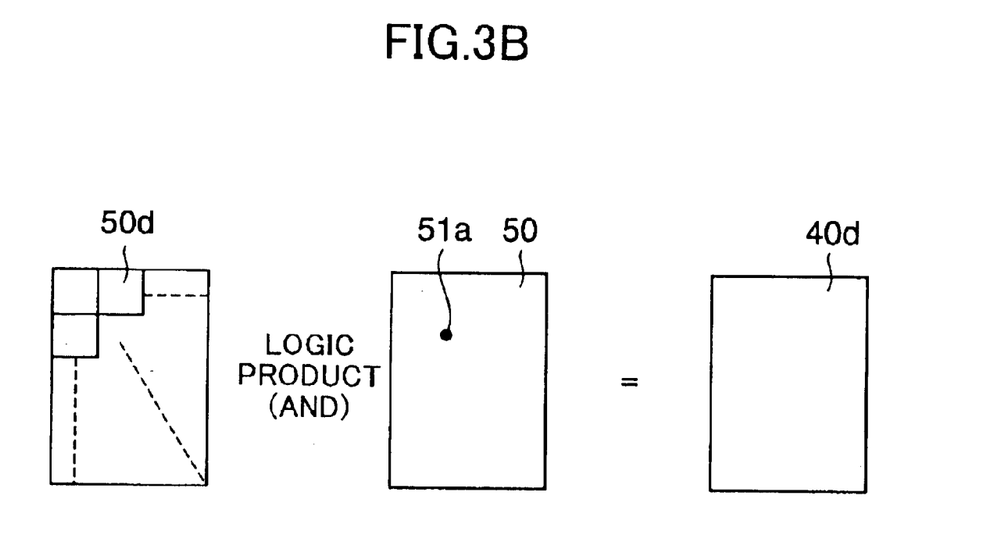

FIGS. 3A and 3B are drawings for explaining the generation of K plane data based on the gray plane data 50. In FIG. 3A, an area of interest 51 in the gray plane data 50 includes a pixel of interest 51a and surrounding pixels 51b.

The pixel of interest 51a of the gray plane data 50 shown in FIG. 3A is selected first, and a multi-value data gray value G(x, y) having 256 levels indicative of the density of the gray color (i.e., the density of gray pixels) is obtained with respect to the area of interest 51 including the pixel of interest 51a and the surrounding pixels 51b. The multi-value data gray value G(x, y) is computed as follows.

$$G(x, y) = (\text{black\_count})(256)/\text{matrix\_size} \quad (1)$$

Here, black_count is the number of gray pixels in the area of interest 51, and matrix_size is the size of the area of interest 51. In FIG. 3A, for example, black_count may be 1, and matrix_size may be 2×2. In this case, G(x, y)=1×256/2×2=64.

After G(x, y) of the pixel of interest 51a is obtained, processing illustrated in FIG. 3B is carried out. In FIG. 3B, a K bitmap dither matrix table 50d corresponding to the G(x, y) of the pixel of interest 51a is placed on the plane. Here, the K bitmap dither matrix table 50d is a matrix that is obtained by giving the value of G(x, y) as inputs to all the pixels of a K bitmap dither matrix. Namely, in the K bitmap dither matrix table 50d corresponding to the G(x, y) value, the number of matrix elements that are 1 is equal to the G(x, y) value.

Thereafter, an AND operation is performed between the logical value of the pixel of interest 51a and the logical value of the matrix element corresponding to the position of the pixel of interest 51a in the K bitmap dither matrix table 50d. The outcome of the AND operation is used as a K value at the position of the pixel of interest 51a in the K plane data 40d. It should be noted that even if the logical value of the pixel of interest 51a is 1, this is not a guarantee that the logical value is 1 at the position of the pixel of interest 51a in the K bitmap dither matrix table 50d. It follows that even if logical value of the pixel of interest 51a is 1 because CMY are all 1, K may be or may not be generated.

The probability of K being generated is proportional to the number of matrix elements that are 1 in the K bitmap dither matrix table 50d corresponding to the G(x, y) value. As described above, the number of matrix elements that are 1 corresponds to the G(x, y) value. Accordingly, the probability of K being generated varies depending on the density of the gray color (i.e., the density of gray pixels) in the area of interest 51 around the pixel of interest 51a. To be specific, the higher the density of the gray color, the higher the probability of K being generated. Namely, the density of pixels at which K is generated is increased as the density of the gray color is increased.

Through the multiplication of any given factor with the G(x, y) value obtained as in the equation (1), the K bitmap dither matrix table 50d can be modified, thereby adjusting the number of K pixels that are generated. For example, the multiplication of a factor less than 1 results in the number of matrix elements that are 1 being decreased in the K bitmap dither matrix table 50d, thereby reducing the number of pixels at which K is generated.

In the example of FIG. 3, the matrix size of the area of interest 51 is set to 2×2 when computing the G(x, y) value of the pixel of interest 51a. This size is not limited to 2×2, and can be any size.

Figure 4:
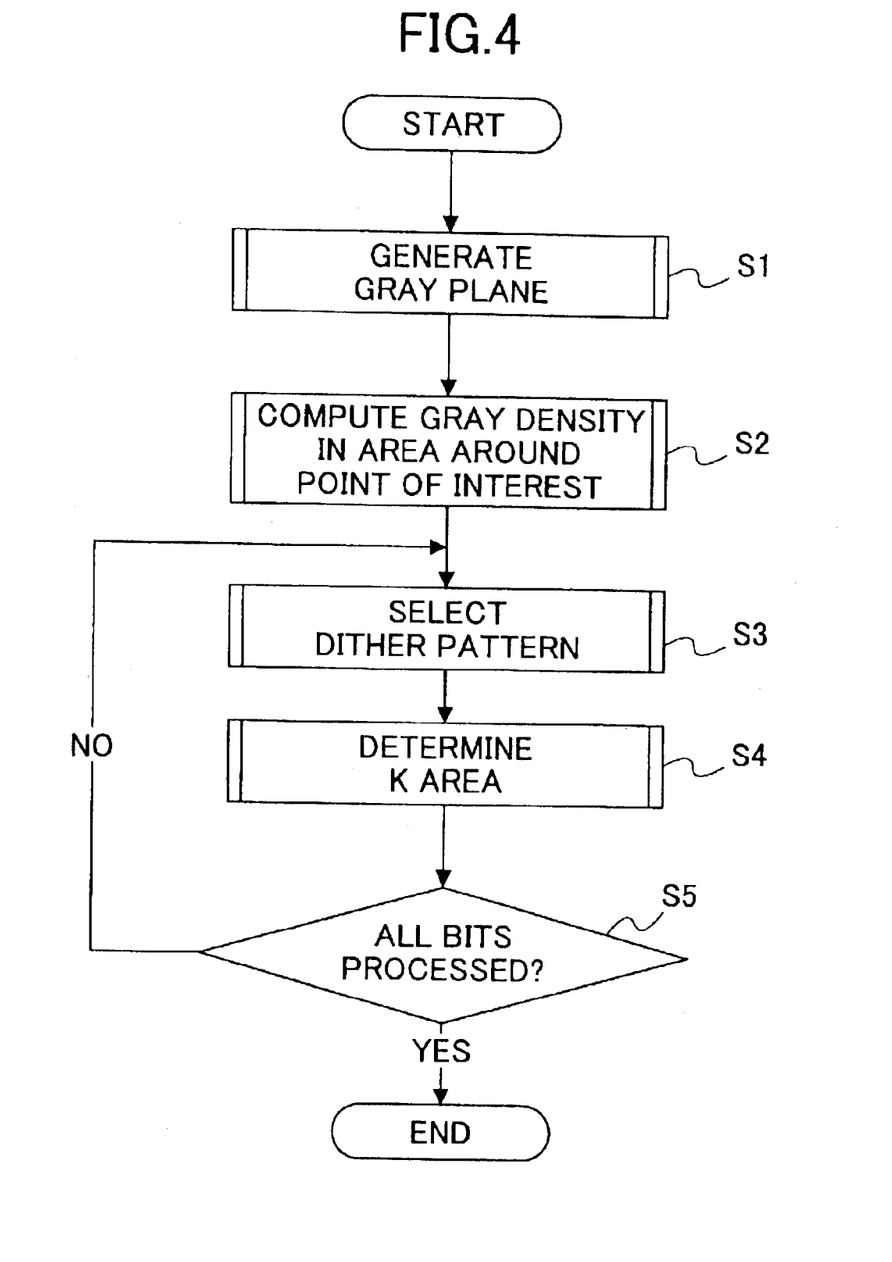
FIG. 4 is a flowchart showing the generation of K.
Figure 5:
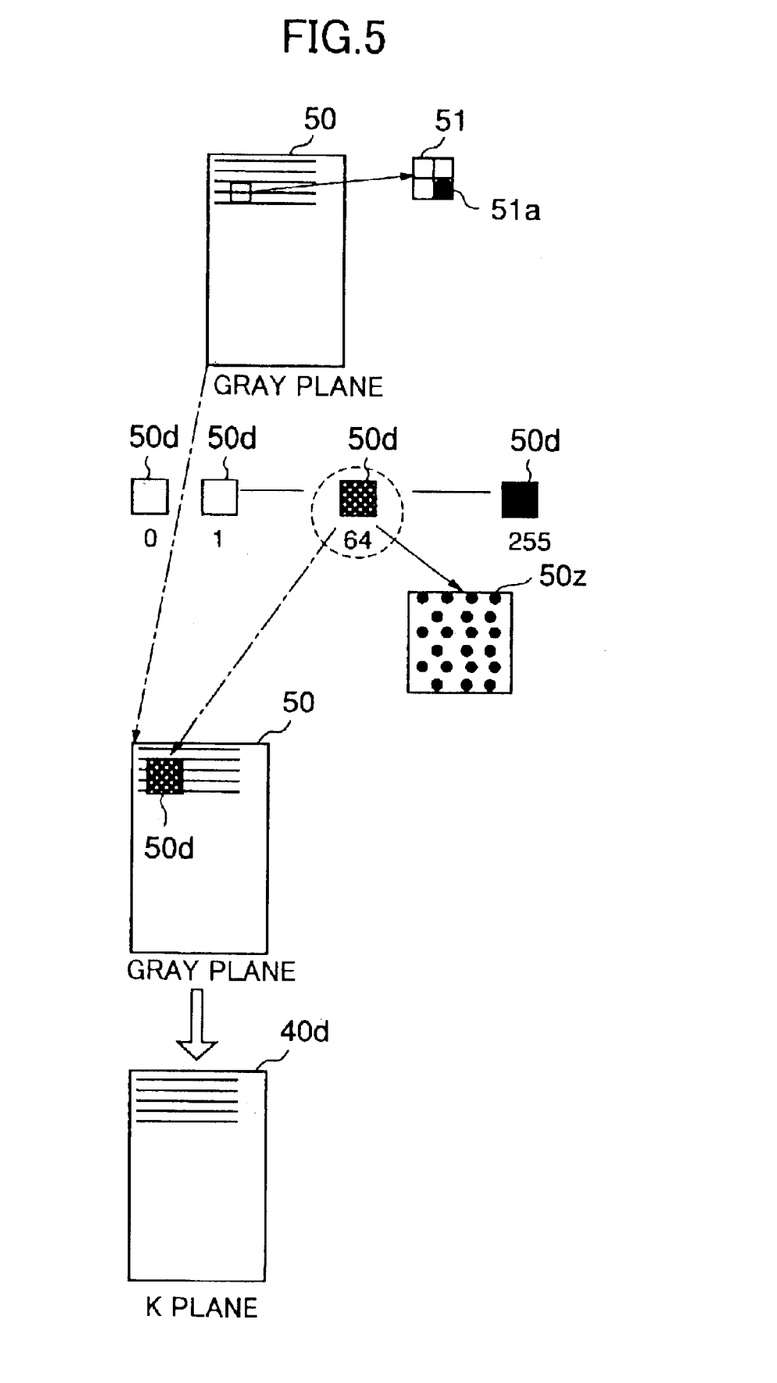
FIG. 5 is a drawing for explaining the generation of K together with the flowchart of FIG. 4.

FIG. 4 is a flowchart showing the generation of K. FIG. 5 is a drawing for explaining the generation of K together with the flowchart of FIG. 4.

At step S1 of FIG. 4, a gray plane is generated by obtaining C&M&Y. This plane 50 is shown in FIG. 5. At step S2, the density of the gray color in the vicinity of the point of interest is computed. Namely, the number of gray pixels is counted in the area of interest 51 around the pixel of interest 51a shown in FIG. 5, thereby obtaining G(x, y).

At step S3, a dither pattern is selected. Namely, a bitmap dither matrix table 50d corresponding to the obtained G(x, y) value is selected from the 256 bitmap dither matrix tables 50d corresponding to the levels 1 through 256 as shown in FIG. 5. If the G(x, y) value is 64, for example, the bitmap dither matrix table 50d corresponding to the level 64 is selected. In this selected bitmap dither matrix table 50d, matrix elements that are equal in number to the G(x, y) value are set to 1 as schematically illustrated in a matrix 50z.

At step S4, K areas are determined. Namely, the bitmap dither matrix table 50d selected at step S3 is arranged on the gray plane 50, and an AND operation is performed between the pixel of interest of the gray plane 50 and the matrix element at the corresponding point in the bitmap dither matrix table. Here, a plurality of bitmap dither matrix tables 50d are arranged by placing them side by side on the gray plane 50 as in the case in which ordinary dither processing is applied.

At step S5, a check is made as to whether all the dots have been processed. That is, it is checked whether the K generation processing has been performed on all the pixels. If all the dots are finished for processing, the procedure comes to an end.

In this manner, all the pixels in each page are processed on a pixel-by-pixel basis, thereby generating the K plane data 40d.

FIGS. 6A through 6D are drawings for explaining the processing of determining pixels to which the UCR processing is applied.

Figure 6A:
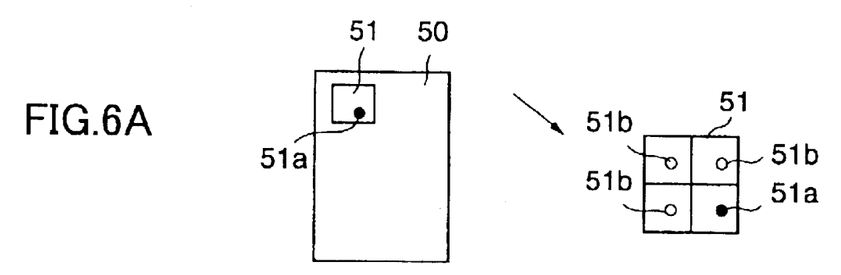
FIGS. 6A through 6D are drawings for explaining the processing of determining pixels to which the UCR processing is applied.

FIG. 6A shows the same processing as that of FIG. 3A, in which a G(x, y) value is obtained with respect to the area of interest 51 around the pixel of interest 51a in the gray plane 50. The G(x, y) values are then used to determine the pixels to which the UCR processing is applied.

Figure 6B:
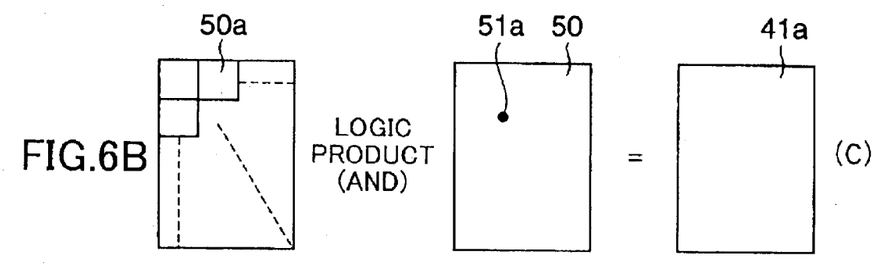

As shown in FIG. 6B, a C bitmap dither matrix table 50a corresponding to the G(x, y) value of the pixel of interest 51a is placed on the plane. In the C bitmap dither matrix table 50a, the number of matrix elements that are 1 is equal to the G(x, y) value. An AND operation is then performed between the logical value of the pixel of interest 51a and the logical value of the matrix element corresponding to the position of the pixel of interest 51a in the C bitmap dither matrix table 50a. The outcome of the AND operation is used as a value of a UCR-processing C plane data 41a at the position of the pixel of interest 51*a*. This operation is performed on all the pixels, thereby generating the UCR-processing C plane data 41*a*. Here, the UCR-processing C plane data 41*a* has a pixel value of 1 if the UCR processing is to be performed to remove the C color at the position of the corresponding pixel.

Figure 6C:
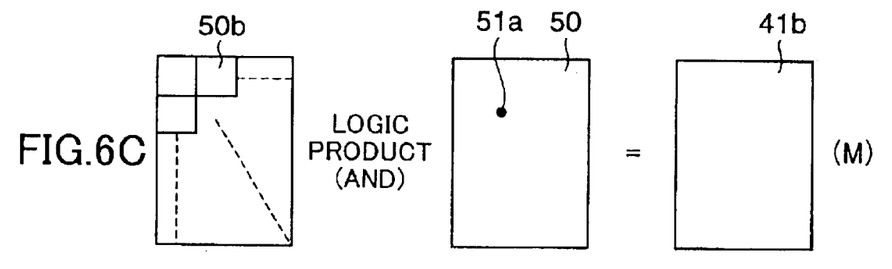
Figure 6D:
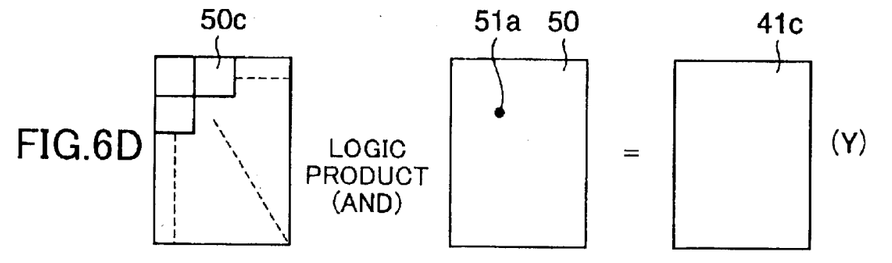

The same processing as applied to the C color is performed with respect to M and Y by using an M bitmap dither matrix table 50*b* and a Y bitmap dither matrix table 50*c* as shown in FIG. 6C and FIG. 6D. This results in a UCR-processing M plane data 41*b* and a UCR-processing Y plane data 41*c* being obtained.

The procedure described above is basically the same as that of the BG processing that was described in connection with FIG. 3A and FIG. 3B. It follows that if the process of obtaining G(x, y) is the same, and if the bitmap dither matrix tables 50*a*–50*c* of the respective colors are the same as the K bitmap dither matrix table 50*d*, the UCR-processing plane data 41*a* through 41*c* of the respective colors end up being the same pattern as the K plane data 40*d*. In this case, the UCR processing will be performed at all the pixels where K has been generated.

In order to avoid performing the UCR processing at all the pixels where K has been generated, the bitmap dither matrix tables 50*a*–50*c* of the respective colors may be made different from the K bitmap dither matrix table 50*d*. This makes it possible to carry out the UCR processing at substantially the same number of pixels as in the case where the K bitmap dither matrix table 50*d* is used, thereby substantially reducing the toner amount of respective colors while keeping rich color at some of the pixels where K is generated.

It is also possible to reduce the number of pixels subjected to the UCR processing so as to avoid performing the UCR processing at all the pixels where K has been generated. To this end, the same table as the K bitmap dither matrix table 50*d* may be used, with a proper multiplication factor to be multiplied with G(x, y), thereby adjusting the number of pixels subjected to the UCR processing. If a multiplication factor was used at the time of the BG processing, a multiplication factor for the UCR processing may be selected to be different from that of the BG processing.

Figure 7:
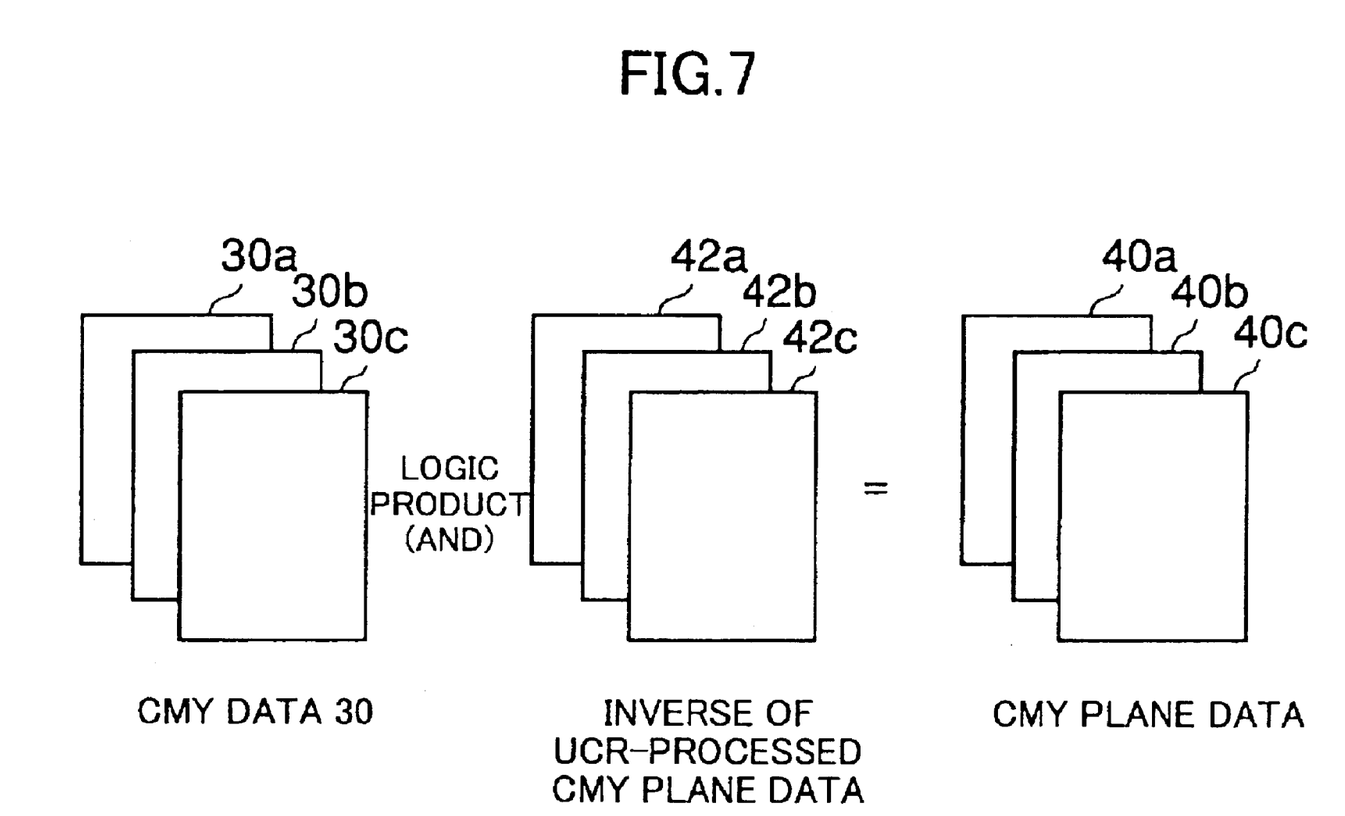
FIG. 7 is a drawing for explaining CMY removal by the UCR processing.

FIG. 7 is a drawing for explaining CMY removal by the UCR processing.

As shown in FIG. 7, data 42*a*, 42*b*, and 42*c* are obtained as inverts of the UCR-processing plane data 41*a*, 41*b*, and 41*c* of the respective CMY colors obtained through the procedures of FIGS. 6A through 6D. Then, the C data 30*a*, M data 30*b*, and Y data 30*c* are logically ANDed with the corresponding inverted data 42*a*, 42*b*, and 42*c*, respectively, thereby finally producing C plane data 40*a*, M plane data 40*b*, and Y plane data 40*c*. In this manner, each color data is set to 0 at pixels where the UCR-processing plane data is 1, thereby removing the color at these positions.

Figure 8:
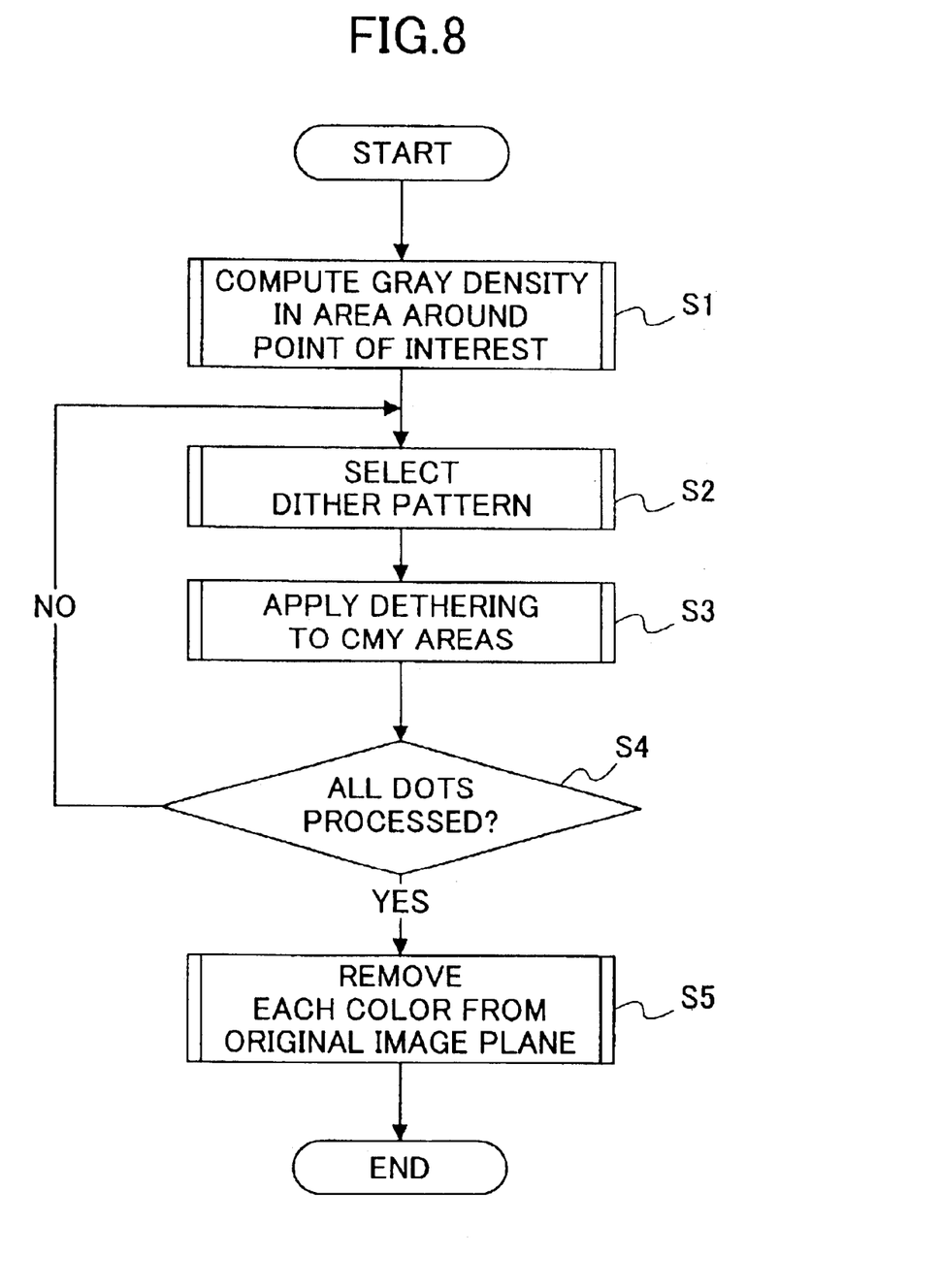
FIG. 8 is a flowchart of the UCR processing.
Figure 9:
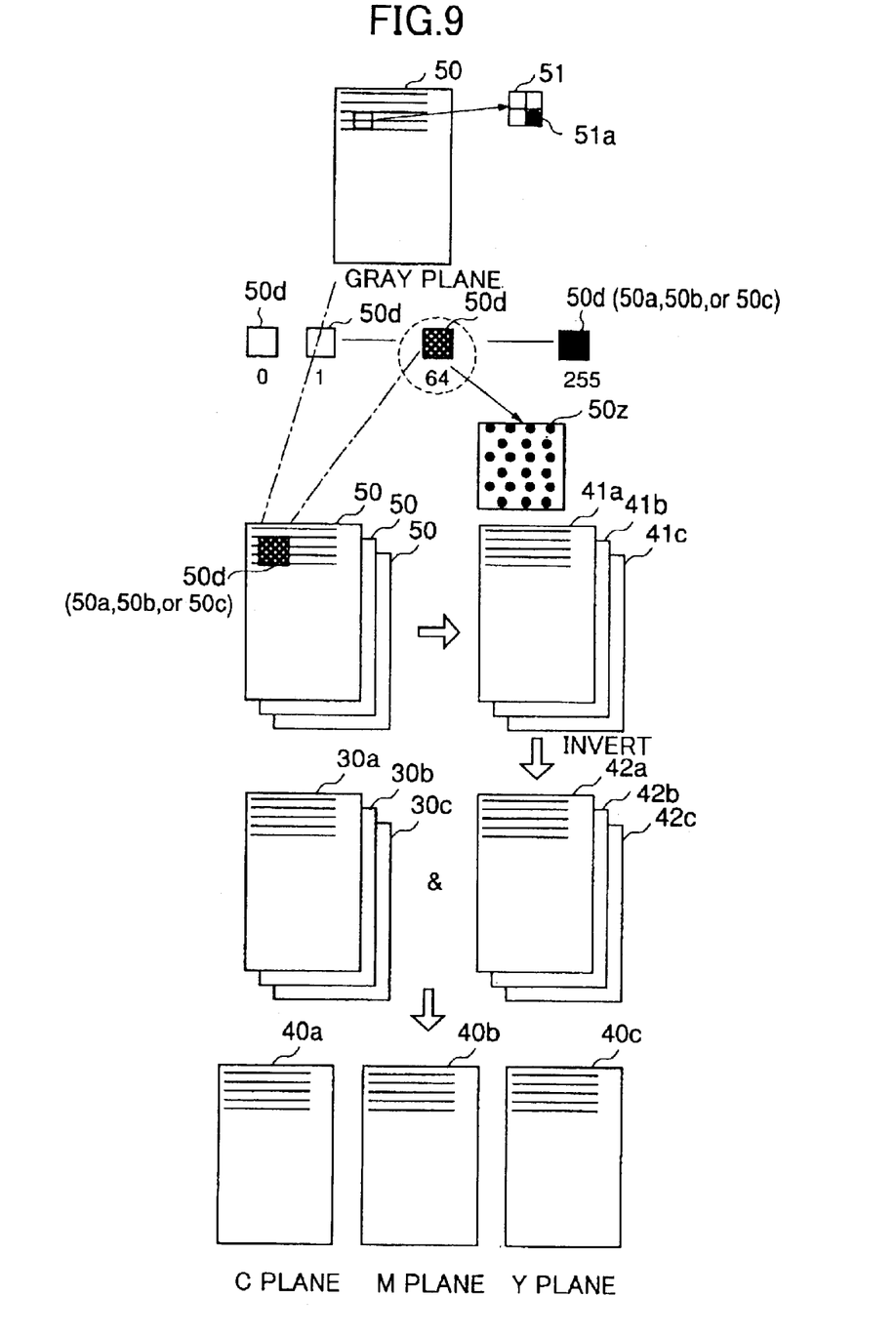
FIG. 9 is a drawing for explaining the UCR processing together with the flowchart of FIG. 8.

FIG. 8 is a flowchart of the UCR processing. FIG. 9 is a drawing for explaining the UCR processing together with the flowchart of FIG. 8.

At step S1 of FIG. 8, the density of the gray color in the vicinity of the point of interest is computed. Namely, the number of gray pixels is counted in the area of interest 51 around the pixel of interest 51*a* in the gray plane 50 shown in FIG. 9, thereby obtaining G(x, y) by using the equation (1).

At step S2, a dither pattern is selected. Namely, a bitmap dither matrix table corresponding to the obtained G(x, y) value is selected from the 256 bitmap dither matrix tables 50*d* (or one of 50*a*, 50*b*, and 50*c*) corresponding to the levels 1 through 256 as shown in FIG. 9. If the G(x, y) value is 64, for example, the bitmap dither matrix table corresponding to the level 64 is selected. In this selected bitmap dither matrix table, matrix elements that are equal in number to the G(x, y) value are set to 1 as schematically illustrated in a matrix 50*z*. If the number of pixels subjected to the UCR processing needs to be reduced, a multiplication factor smaller than 1 may be multiplied with the G(x, y) value so as to select a bitmap dither matrix table that corresponds to the outcome of the multiplication.

At step S3, C, M and Y areas are subjected to dithering. Namely, the bitmap dither matrix table selected at step S3 is arranged on the gray plane 50, and an AND operation is performed between the pixel of interest of the gray plane 50 and the matrix element at the corresponding position in the bitmap dither matrix table. Here, a plurality of bitmap dither matrix tables are arranged by placing them side by side on the gray plane 50 as in the case in which ordinary dither processing is applied.

At step S4, a check is made as to whether all the dots have been processed. That is, it is checked whether the above processing has been performed on all the pixels. If all the dots are finished for processing, the UCR-processing plane data 41*a* through 41*c* of the respective colors are obtained. Thereafter, at step S5, each color is removed from the original image planes. Namely, as shown in FIG. 9, the original C data 30*a*, M data 30*b*, and Y data 30*c* are logically ANDed with the inverted data 42*a*, 42*b*, and 42*c* of the UCR-processing planes of the corresponding colors, respectively. This results in the C plane data 40*a*, M plane data 40*b*, and Y plane data 40*c* being obtained. This brings the procedure to an end.

In the following, a variation of the BG processing and the UCR processing according to the present invention will be described.

In this variation, a predetermined process is applied to the gray plane 50 in advance, and this processed gray plane will be subjected to the processing of FIG. 3A and FIG. 6A. The predetermined process that is applied to the gray plane 50 is aimed at achieving a further improvement in image quality.

Figure 10:
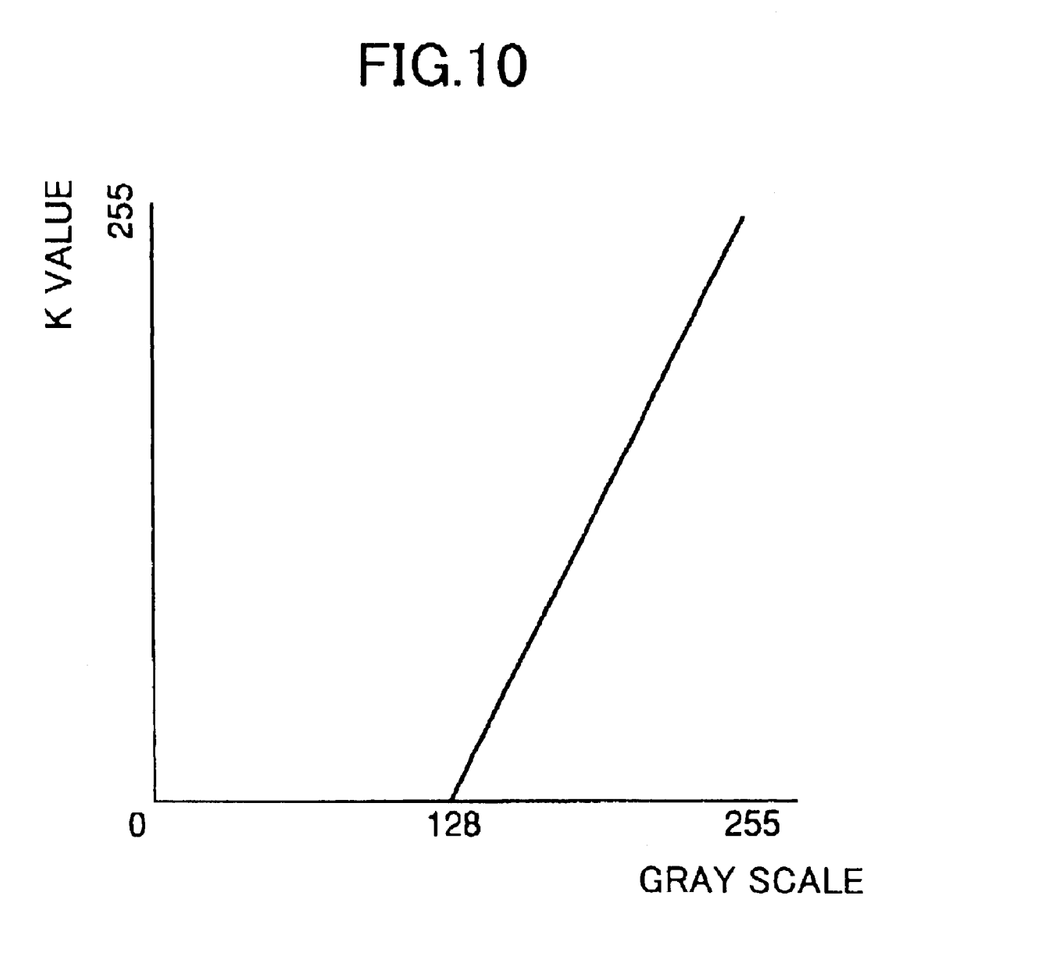
FIG. 10 is a drawing showing the relationship between an input gray level and K generation.

When the BG processing is performed in general, it is known that a resulting image has improved image quality if the amount of K generation is reduced where gray levels are lower and if the amount of K generation is increased where gray levels are higher. As shown in FIG. 10, therefore, it is generally preferable to generate K only for levels above a predetermined start point (i.e., 128 in this case) among the gray levels ranging from 0 to 255.

In order to achieve this, the variation of the present invention applies a predetermined process to the gray plane 50 in advance, thereby removing gray dots at positions corresponding to gray levels below the start level of K generation.

Figure 11:
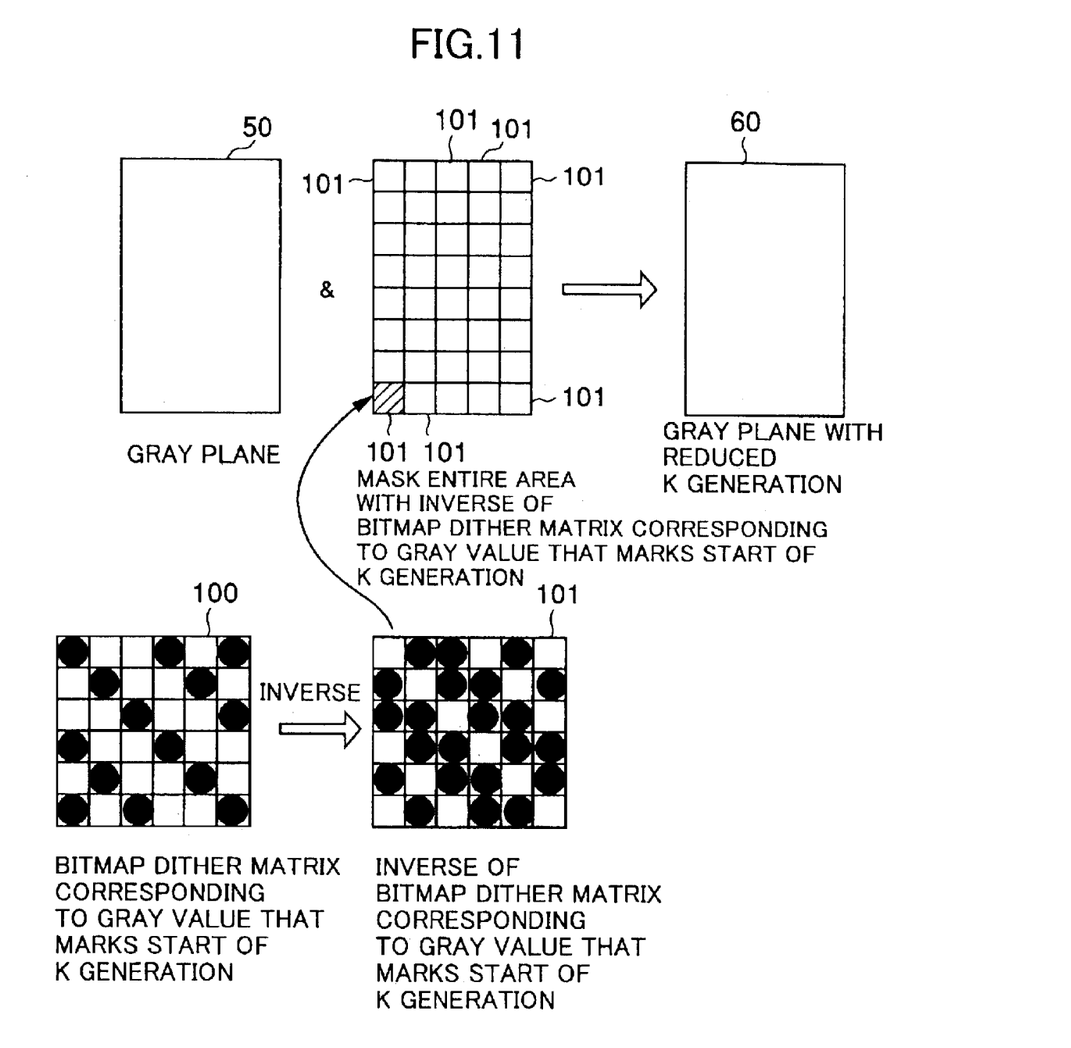
FIG. 11 is a drawing for explaining a predetermined process applied to the gray plane.

FIG. 11 is a drawing for explaining a predetermined process applied to the gray plane 50.

First, a value where the BG processing starts, i.e., a level at which the generation of K starts, is determined. Then, a K bitmap dither matrix 100 is prepared that corresponds to the starting gray level. The bitmap dither matrix 100 corresponding to the starting gray level is obtained by giving the starting gray level as inputs into the pixels of the dither matrix for dither processing. As shown in FIG. 11, the bitmap dither matrix 100 has matrix elements being 1 that are equal in number to the value of the starting gray level. The bitmap dither matrix 100 is inverted to provide a bitmap dither matrix 101.

In the bitmap dither matrix 101 obtained in this manner, the positions of matrix elements that are 0, i.e., the positions of pixels that are white in FIG. 11, correspond to pixels that are 1 when the input is the starting gray level. These positions fully embrace pixels that are 1 also when the input is below the starting gray level. That is, any pixel that is 1 when the input is below the starting gray level is positioned at a matrix element that is 0 in the bitmap dither matrix 101. A dither matrix that satisfies these conditions generates a pattern of a higher gray level in such a manner that the pattern of a higher gray level includes additional black dots on top of the black dots already in existence at the lower gray levels.

Bitmap dither matrices 101 are arranged side by side to cover the entirety of the gray plane 50, followed by a mask operation that generates the gray plane 60. Namely, the pattern that is produced by arranging the bitmap dither matrices 101 side by side is logically ANDed with the gray plane 50 to generate the gray plane 60. In the gray plane 50, the number of pixels that are 1 is decreased so as to reduce the amount of K generation.

In the gray plane 60 generated in this manner, because of the mask operation described above, a pixel value is 0 for any pixels that are 1 when the gray level of the original image is smaller than or equal to the starting gray level. Use of the gray plane 60 for the BG processing shown in FIG. 3A and FIG. 3B thus results in K being not generated at the pixels that are 1 at the levels no higher than the starting gray level. By the same token, the use of the gray plane 60 for the UCR processing shown in FIG. 6A and FIG. 6D results in the UCR processing being not preformed on the pixels that are 1 at the levels no higher than the starting gray level.

Figure 12:
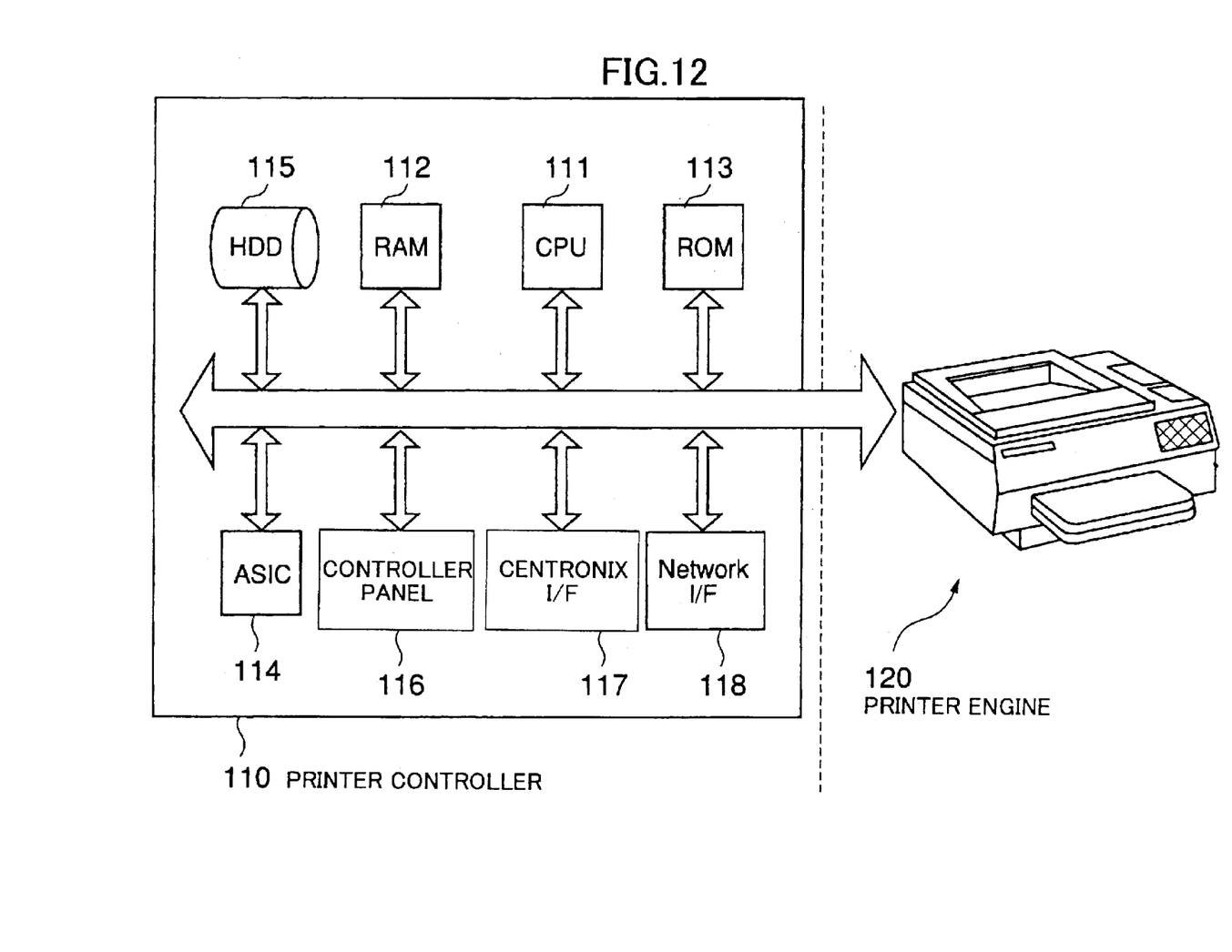
FIG. 12 is a drawing showing the configuration of a color printer apparatus to which the present invention is applied.

FIG. 12 is a drawing showing the configuration of a color printer apparatus to which the present invention is applied. The color printer apparatus according to the present invention includes a printer controller 110 and a printer engine 120. The printer controller 110 controls the printer engine 120 to carry out printing operations. The printer controller 110 includes a CPU 111, a RAM 112, a ROM 113, an ASIC 114, a hard-disk drive 115, a controller panel 116, a centronics I/F 117, and a network I/F 118.

User inputs into the controller panel 116 operate the color printer apparatus of the present invention. Alternatively, the color printer apparatus of the present invention may be operated based on instructions supplied to the network I/F 118 through the network. The CPU 111 controls the apparatus based on basic programs stored in the ROM 113, and executes programs loaded to the RAM 112 from the hard-disk drive 115 to control the operation of the color printer apparatus. The ASIC 114 attends to various control operations with high-speed computation power so as to assist the control operation by the CPU 111. The centronics I/F 117 is provided as an interface for communicating with peripheral devices.

The CPU 111 performs the BG processing and the UCR processing of the present invention described in connection with the above embodiments. Namely, the color conversion processing unit 1, the dither processing unit 2, the pixel-by-pixel BG-processing/UCR-processing unit 3, and the like shown in FIG. 1 are implemented as functions provided by the CPU 111 and software.

In the present invention as described above, straightforward generation such as K=C&M&Y is not practiced when generating K from binary CMY data, and a decision as to whether or not to generate K is made based on information about the gray levels and a bitmap dither matrix. As a result, the number of pixels at which K is generated is reduced compared with the case where K=C&M&Y is practiced, thereby avoiding the undesirable loss of rich color in the gray-color areas of a printed image.

Further, the probability of the UCR processing being performed is controlled by multiplying gray levels with a multiplication factor rather than performing the UCR processing on all the K pixels determined by the BG processing. This reduces the number of pixels at which the UCR processing is performed, thereby making it possible to print images with richer color.

Moreover, pixels subjected to the UCR processing are not selected based on the data of the K bitmap dither matrix table, but are selected based on the data of the CMY bitmap dither matrix tables. This insures the printing of images with rich color while securing a substantial amount of toner reduction in each color.

Further, in the gray plane used for the BG processing and the UCR processing, pixels below a predetermined level are masked so as to prevent K generation at pixels below the predetermined level, thereby generating images of high quality.

What is claimed is:

1. A printing apparatus, comprising:
    a dither processing unit which converts multi-value data of C (cyan), M (magenta), and Y(yellow) into binary CMY data; and
    a black generation processing unit which generates a gray plane by a logical product between C, M, and Y of the binary CMY data, and generates K (black) at positions of some of gray pixels of the gray plane according to a probability responsive to a density of the gray pixels in the gray plane while refraining from generating K at positions of remaining gray pixels, and wherein said black generation processing unit computes the gray level of a gray area of interest around a pixel to be processed.

2. The printing apparatus as claimed in claim 1, wherein said black generation processing unit relies on a dither matrix corresponding to a level of the density to decide whether or not to generate K.

3. The printing apparatus as claimed in claim 2, wherein said black generation processing unit superimposes a dither matrix table on the gray plane, said dither matrix table having matrix elements thereof being 1 corresponding in number to the level of the density, and wherein said black generation processing unit generates K at positions of the gray pixels that overlap the matrix elements being 1.

4. The printing apparatus as claimed in claim 2, further comprising an under-color removal processing unit which performs under-color removal processing at positions of some of the gray pixels of the gray plane according to a probability responsive to the density of the gray pixels in the gray plane, wherein, said under-color removal processing unit relies on the dither matrix to decide whether or not to perform the under-color removal processing.

5. The printing apparatus as claimed in claim 2, further comprising an under-color removal processing unit which performs under-color removal processing at positions of some of the gray pixels of the gray plane according to a probability responsive to the density of the gray pixels in the gray plane, wherein said under-color removal processing unit relies on another dither matrix to decide whether or not to perform the under-color removal processing.

6. The printing apparatus as claimed in claim 1, wherein the density corresponds to a number of gray pixels in a predetermined area surrounding a pixel of interest in the gray plane.

7. The printing apparatus as claimed in claim 1, wherein said black generation processing unit controls the probability by multiplying the density by a factor.

8. The printing apparatus as claimed in claim 1, further comprising an under-color removal processing unit which performs under-color removal processing at positions of some of the gray pixels of the gray plane according to a probability responsive to the density of the gray pixels in the gray plane.

9. The printing apparatus as claimed in claim 8, wherein said under-color removal processing unit superimposes a dither matrix table on the gray plane, said dither matrix table having matrix elements thereof being 1 corresponding in number to a level of the density, and wherein said under-color removal processing unit performs the under-color removal processing at positions of the gray pixels that overlap the matrix elements being 1.

10. The printing apparatus as claimed in claim 1, wherein said black generation processing unit generates the gray plane as a logical product between an inverse of a dither matrix pattern corresponding to a predetermined level and said logical product between C, M, and Y of the binary CMY data.

11. A method of printing processing, comprising the steps of:

generating a gray plane by a logical product between C, M, and Y of binary CMY data that is generated from multi-value data of C (cyan), M (magenta), and Y (yellow); and generating K (black) at positions of some of gray pixels of the gray plane according to a probability responsive to a density of the gray pixels in the gray plane while refraining from generating K at positions of remaining gray pixels.

12. The method as claimed in claim 11, further comprising a step of performing under-color removal processing at positions of some of the gray pixels of the gray plane according to a probability responsive to the density of the gray pixels in the gray plane.

13. A method of printing processing, comprising the steps of:

generating a gray plane by a logical product between C, M, and Y of binary, CMY data that is generated from multi-value data of C (cyan), M (magenta), and Y (yellow); and generating K (black) at positions of some of gray pixels of the gray plane according to a probability responsive to a density of the gray pixels in the gray plane while refraining from generating K at positions of remaining gray pixels; and wherein said step of generating K (black) is performed by computing the gray level of a gray area of interest around a pixel to be processed, selecting a dither matrix pattern corresponding to the computed gray level, and generating black data by a logical product operation between the pixel to be processed and the selected dither matrix.

* * * * *

UNITED STATES PATENT AND TRADEMARK OFFICE
CERTIFICATE OF CORRECTION

PATENT NO. : 6,837,570 B2
DATED : January 4, 2005
INVENTOR(S) : Masato Takahashi

It is certified that error appears in the above-identified patent and that said Letters Patent is hereby corrected as shown below:

Title page, Item [54] and Column 1, lines 1 and 2,
Title, should be -- PRINTING APPARATUS AND METHOD OF PRINTING --;

Title page,
Item [30], Foreign Application Priority Data, should be -- JP 2001-069254 -- and its filing date should be -- March 12, 2001 --.

Signed and Sealed this

Thirteenth Day of September, 2005

JON W. DUDAS
*Director of the United States Patent and Trademark Office*